Patented Feb. 23, 1932

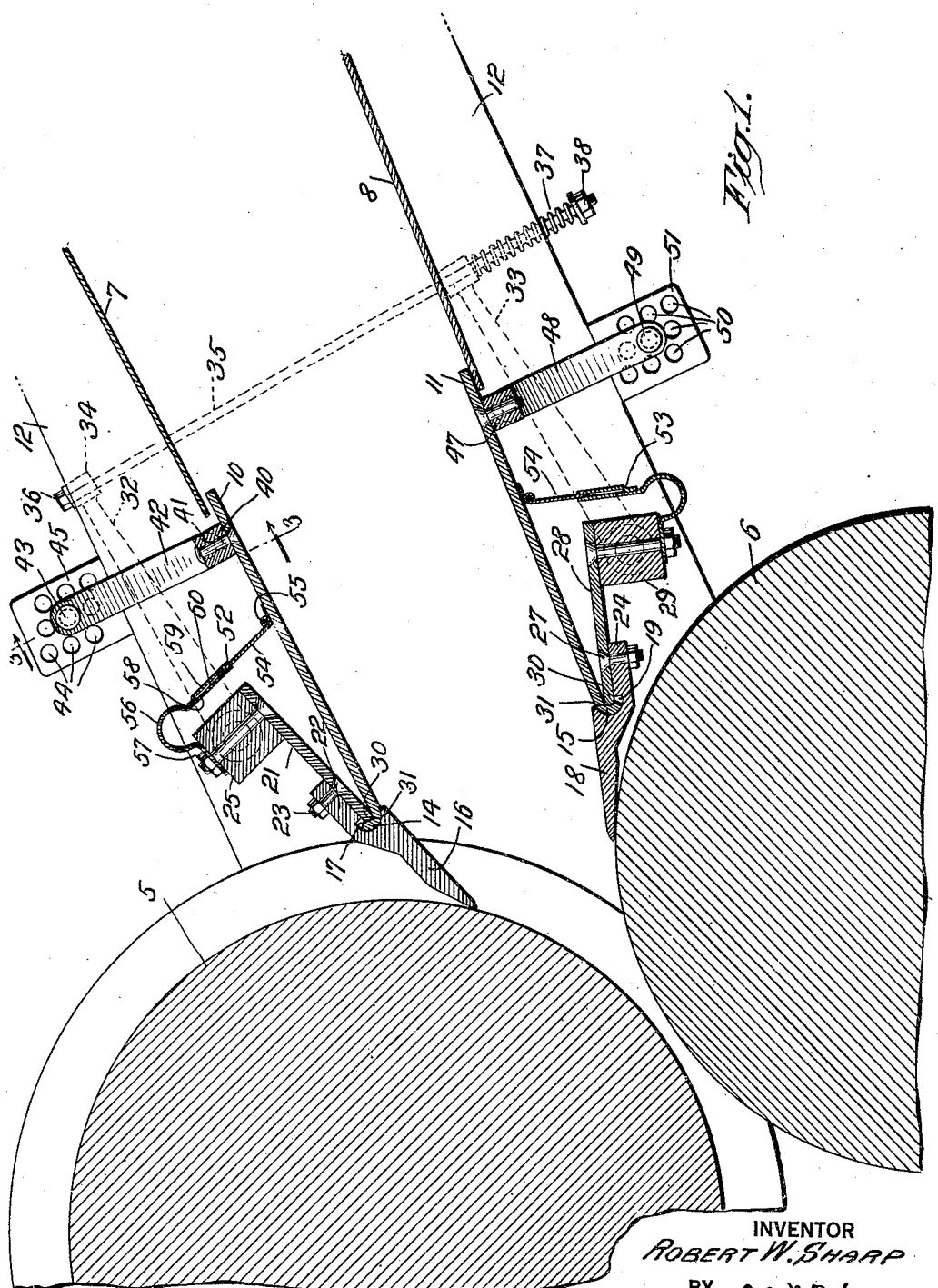

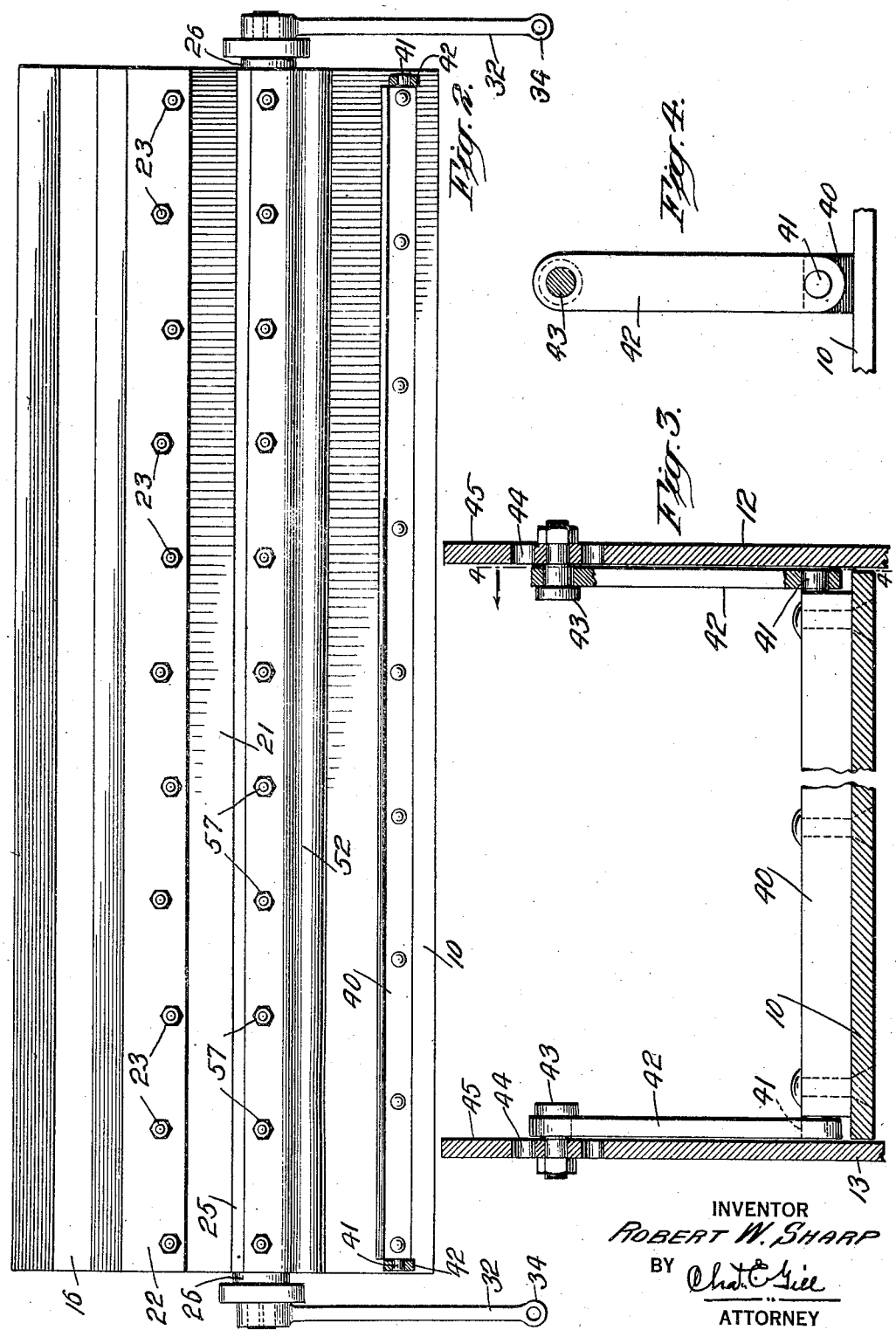

1,846,914

UNITED STATES PATENT OFFICE

ROBERT W. SHARP, OF BATON ROUGE, LOUISIANA

SUGAR CANE MILL

Application filed June 9, 1925. Serial No. 35,955.

The invention relates to the carriers or chutes disposed between adjacent sugar-cane mills arranged in series and used for conveying or directing the bagasse from the discharge side of one set of macerating or expressing rollers of a mill to the feed side of a similar set of macerating or expressing rollers of the next succeeding mill. I have in my pending application, Serial Number 717,680, which has matured into Patent No. 1,673,921, dated June 19, 1928, described such carriers or chutes as provided at their inlet end with an upper feed plate and a lower feed plate, either or both of which may be adjustable, said feed plates being connected at their ends nearest the adjacent set of rollers with plates having scrapers or toes which contact with the surfaces of the rollers to remove the crushed cane therefrom and direct it between the feed plates and into the chute. It will be understood in this connection that the efficient operation of the mill depends on the control of the blanket of bagasse entering the intake end of the carrier and its unhindered passage through the same.

The present invention relates more particularly to improvements in the manner of and means for securing the adjustment of the upper feed plate or both the upper and lower feed plates to control the blanket of bagasse passing into and through the carrier and to the automatic adjustment of the scraper plates and their toes with relation to their respective rollers independently of the adjustment of the feed plates. In accordance with my present invention the means for the adjustment of the feed plates is independent of the scraper plates and of simplified, durable and convenient construction.

One object of the invention is to provide an intermediate carrier or chute for sugar cane mills having improved means for the adjustment of the upper and lower feed plates or of the upper plate alone if only one feed plate is made use of. A further object of the invention is to provide for the automatic adjustment of the scraper toes, as they wear off, toward and against their respective rollers, without interfering with the position or adjustment of the feed plates. A further object of the invention is to provide means for protecting the joint between the outer end portions of adjustable scrapers and the adjacent portions of the feed plates with which they are connected so as to prevent dust, pieces of bagasse or other dirt from entering the joint and so interfere with the proper adjustment of the feed plates or of the scrapers against the rollers. These objects are accomplished by the improved intermediate carrier or chute for sugar-cane mills hereinafter described and particularly pointed out in the claims.

The preferred form of the invention is illustrated in the accompanying drawings in which:

Fig. 1 is a longitudinal section through one end portion of the improved bagasse carrier or chute, which is shown in proper relation to the rollers of a sugar-cane mill, the rollers being shown in section and partly broken away;

Fig. 2 is a detached top view of the upper scraper plate with its scraper toe attached thereto and with means for adjusting the scraper toe to the roller against which it bears;

Fig. 3 is an enlarged sectional view, broken away in the middle, taken on the line 3—3 of Fig. 1, and Fig. 4 is an enlarged detail in side elevation of one of the links for supporting the upper end of the scraper plate.

The series of sugar-cane mills in connection with which the improved carrier or chute is used may be of any preferred construction and arrangement, it being understood that the carrier or chute of the present invention is used to convey the bagasse from the macerating rollers of one mill to a similar set of rollers of the next succeeding mill. The present invention is concerned only with the end of the chute at the discharge side of a pair of macerating rollers, the upper roller being indicated in the drawings at 5 and the lower roller at 6. The top and bottom walls of the feed or intake end of the main body of the chute are indicated at 7 and 8, respectively. Through this chute is delivered a blanket of bagasse from the rollers 5 and 6 to the rollers of the next succeeding mill. These parts are arranged as is usual in sugar-cane mill construction.

The device of the present invention for delivering the properly proportioned blanket or mass of bagasse into the intake end of the main body of the chute comprises a top feed plate 10 and a bottom feed plate 11. These feed plates are preferably upwardly inclined and extend throughout the length of the rollers, the space between them being closed at the ends of the plates by means of the usual side walls 12 and 13 (Fig. 3) of the carrier or chute. The rear ends of the feed plates 10 and 11 are received between and overlap slightly the forward ends of the top and bottom walls 7 and 8 of the main body of the chute.

The forward end of the upper feed plate 10 is curved upwardly at 14 and the forward end of the lower feed plate 11 is curved downwardly at 15. Pivotally connected with the curved end 14 of the upper feed plate 10 is an upper scraper toe 16 having a curved recess 17 in which the curved end 14 of the plate 10 is received. The scraper toe 16 is substantially as long as the upper roller 5 and is arranged to bear against it. In a similar manner the lower scraper toe 18, adapted to bear against the lower roller 6, is provided with a curved recess 19 by which it is pivotally mounted on the curved end of the lower feed plate 11.

The means for adjusting the scraper toe 16 against the upper roller 5 consists of a plate 21 which extends throughout the length of the scraper 16 and is secured to the underside of the heel portion 22 thereof by means of the bolts 23. The plate 21 is secured at its rear edge to the underside of a bar 25 provided at its ends with the trunnions 26 (Fig. 2) adapted to be journaled in the side walls of the main body portion of the carrier or chute. The heel portion 24 of the lower scraper toe 18 is fastened by means of the bolts 27 to the front edge of a plate 28 which is the same in construction as the plate 21. The plate 28 is secured at its rear edge to the upper side of a bar 29, corresponding to the bar 25, and provided at its ends with trunnions journaled in the side walls of the chute. It will be observed that the forward ends 30 of the plates 21 and 28 are rounded and are received in the curved recesses 31 formed in the rear side of the forward ends of the feed plates 10 and 11 by the curved portions 14 and 15. This arrangement is part of the pivotal mounting of the scraper toes 16 and 18 on the forward ends of the feed plates.

In order that the scraper toes 16 and 18 may be held with the proper amount of tension against their respective rollers 5 and 6, the projecting ends of the bars 25 and 29 are provided with the rearwardly extending arms 32 and 33, respectively, the rear ends of which are formed as the bosses 34 bored to loosely receive the rods 35, only one of which is indicated in the drawings. The upper end of each rod 35 is provided with a head 36 which bears against the upper side of the boss 34 of the arm 32 in which the rod 35 is supported. The lower end of each rod 35 projects beyond the lower side of the boss 34 of the arm 33 through which the rod 35 passes and supports a spring 37, the tension of which may be adjusted by the nut 38 screwed on the lower end of the rod 35. As the scraper toes 16 and 18 wear away the tension of the springs 37 is increased by turning the nuts 38, with the result that the outer ends of the arms 32 and 33 are drawn toward each other, causing the bars 25 and 29 to turn in their bearings and so force the scraper toes 16 and 18 against their rollers.

The feed plates 10 and 11 may each be independently initially positioned and adjusted as to its inclination for the purpose of controlling the thickness of the blanket of bagasse to pass into and through the carrier or chute during the operation of the mill, and the adjustment of these plates, particularly the upper plate, to secure such control is of particular importance. The plates 10, 11 may also be adjusted with relation to their inclination to the scraper plates 21, 28 and scrapers or toes 16, 18 as said scrapers or toes wear down from use and must be set against the respective rollers 5 and 6. For these purposes the upper edge of the rear end of the feed plate 10 is provided with a bar 40 substantially as long as the plate itself, as shown in Fig. 2. Each end of the bar 40 is turned down to provide a bearing 41 which is loosely embraced by the lower end of a link 42. The upper ends of the links 42 are pivotally mounted on the studs 43 (Fig. 3) adapted to be received in one or another of the holes 44 in the plates 45 rising from the upper edges of the side walls 12 and 13 of the body section of the carrier or chute. It will be observed by reference to Fig. 1 that the holes 44 in the plates 45 are in staggered relation so that by placing the studs 43 in different holes the vertical position of the rear end of the feed plate 10 is correspondingly adjusted. In practice the centers of the holes 44 lie in horizontal planes spaced substantially one-half inch apart. There may be any desired number of holes in each plate 45, nine being shown in the illustrated embodiment of the invention.

The rear end of the lower feed plate 11 may be vertically adjusted by means similar to that provided for the adjustment of the upper feed plate 10. This means consists of a bar 47 secured to the lower edge of the feed plate 11. The ends of the bar 47 are turned down to loosely receive the upper ends of the links 48 (only one being shown). The lower end of each link 48 is pivotally mounted on a stud 49 adapted to be received in one or the other of the holes 50 in the plate 51 depending from the bottom edges of the side walls 12 and 13 of the main body of the chute. By supporting the rear or upper ends of the feed plates 10 and 11 from the links 42 and 48 or equivalent means provision is thereby secured for a wide range of adjustment of the plates, the purposes of the adjustment being, as will be understood, to control the thickness of blanket of bagasse passing into the carrier and also to compensate for the wear and consequent setting of the scraper toes 16, 18 against the rollers 5, 6.

The tightening of the nuts 38 against the springs 37 places said springs under a tension which acts to urge the scraper toes 16, 18 against the rollers 5, 6, and as the said toes wear down said nuts may, if found necessary, be further tightened against said springs to maintain said springs under adequate tension.

One of the features of the present invention is to prevent dust, pieces of bagasse and other dirt from entering the spaces between the plates 10, 21 and plates 11, 28 and clogging the joint between the forward curved ends of the feed plates 10 and 11 and the curved recesses 17 and 19 in the scraper toes 15 and 18 in which they are received. For this purpose the guards indicated generally at 52 and 53 are provided. These guards are substantially as long as the plates 21 and 28, as shown in Fig. 2, and extend from one side wall 12 to the other side wall 13 of the main body portion of the chute. The guards 52 and 53 are substantially alike in construction and the corresponding parts are designated by the same reference characters. It is therefore only necessary to describe the construction and arrangement of the upper guard 52.

The guard 52 consists of two parts or sections, the lower section 54 being in the form of a plate rising from the upper surface of the feed plate 10 and being hinged thereto at 55. The upper section of the guard 52 is provided with a goose neck curve 56 to constitute a spring, the forwardly projecting end 57 of the curved section being secured to the top surface of the bar 25 by the bolts by which the plate 21 is secured to the lower surface of the bar 25. The rear part 58 of the upper section of the guard 52 extends downwardly and with the plate 59 secured at its upper edge to the rear side of the part 58 of the guard constitutes a slot 60 to receive the upper edge of the lower section 54 of the guard. This arrangement permits the two sections of the guard to telescope upon each other when the scraper toes are adjusted to their rollers and the feed plates 10 and 11 are removed relatively to each other.

It will be understood that the means for supporting and adjusting the rear ends of the feed plates 10 and 11 relatively to each other is only one form of means which may be employed for this purpose, the principle involved being to support the outer ends of the feed plates so that they may be adjusted independently of the adjustment of the scrapers 16 and 18 to compensate for the increased spacing of the scrapers due to adjusting them when worn, the nature of the bagasse and other conditions.

By mounting the rear ends of the upper and lower feed plates in the manner shown or by some similar arrangement, a number of apparent advantages in feeding the bagasse from one mill to the next succeeding mill are secured:—The outer or rear end of the upper feed plate 10 is only slightly affected by the movement of the scraper toe 16 against the roller 5. Moreover this arrangement permits of a wide range of adjustment of the plates 10, 11 separately and in their angular relation to each other thereby enabling the proper control of the thickness of the blanket of bagasse and assuring the desired feed to the rollers of the next succeeding mill. A further advantage is that the pressure transmitted to the upper feed plate 10 by the bagasse accumulating between it and the bottom feed plate tends to hold the scraper toe 16 against the roller 5.

The perforated plates 45, 51 are preferably welded or otherwise secured to or formed on the sides 12, 13 or other stationary rigid portions of the carrier and the cooperating links 42, 48 are preferably connected with the feed plates 10, 11, but obviously a mere reversal of this arrangement whereby the perforated plates were connected with the feed plates and the links with stationary portions of the carrier, would not constitute a departure from my invention.

What I claim as my invention and desire to secure by Letters-Patent, is:

1. An intermediate chute for sugar-cane mills comprising, a feed plate, a scraper toe movably connected with the forward end of the feed plate and arranged to contact with the adjacent roller of the mill, and means for preventing dirt from entering the joint between the feed plate and the scraper toe.

2. An intermediate chute for sugar-cane mills comprising, a feed plate, a scraper toe movably connected with the forward end of the feed plate and having a part extending rearwardly in divergent relation with the feed plate, means for adjustably holding the feed plate against the adjacent roller of the mill, means for adjustably supporting the feed plate, and guard means for preventing dirt from entering the joint in the forward end of the feed plate and the scraper toe consisting of a plate hinged to the upper surface of the feed plate, a spring plate connected with the means for supporting the scraper toe, and a telescopic connection between the two sections of the guard means.

3. An intermediate chute for sugar-cane mills having, in combination with the side walls of the main body portion of the chute, an upper feed plate, a lower feed plate, means for adjustably supporting the rear ends of the feed plates from the side walls of the chute, a scraper toe movably connected with the forward end of the upper feed plate and adapted to bear against the upper roller of the mill, a scraper toe movably connected with the forward end of the lower feed plate and adapted to bear against the lower roller of the mill, means for adjustably supporting and holding the scraper toes against their respectively rollers, and guard means for preventing the ingress of dirt into the joint between the forward end of the feed plates and the scraper toes.

In testimony whereof I hereunto affix my signature.

ROBERT W. SHARP.